May 24, 1966  J. H. COZENS  3,253,199

CAPACITORS HAVING POROUS MATERIAL TO AID IMPREGNATION

Filed Jan. 29, 1964

*INVENTOR.*
JOHN H. COZENS
BY
Connolly and Hutz
HIS ATTORNEYS

United States Patent Office 3,253,199
Patented May 24, 1966

3,253,199
CAPACITORS HAVING POROUS MATERIAL TO AID IMPREGNATION
John H. Cozens, Uxbridge, England, assignor to Sprague Electric Company, North Adams, Mass., a corporation of Massachusetts
Filed Jan. 29, 1964, Ser. No. 340,878
Claims priority, application Great Britain, Jan. 29, 1963, 3,679/63
1 Claim. (Cl. 317—260)

The present invention relates ot electrical capacitors having interleaved layers of conductive and dielectric material, and more particularly to fully impregnated capacitors wherein the dielectric material is plastic film.

In some plastic film capacitors, the conductive and dielectric sheets or strips are stacked in a flat condition, but in others they are convolutely rolled together to constitute a wound capacitor. It is desirable that such capacitors be fully impregnated to ensure that there are no voids present in which ionization of residual gas can take place, and that edges of electrodes which are in contact with dielectric strips are protected against corona discharges which might otherwise occur. This is of particular importance when the capacitors are to be operated at high voltages, for example, at 500 v. and over with D.C. operation, and at somewhat lower voltages with A.C. operation.

The electrodes of conductive material may be discrete metal foils, but are preferably layers of metallization applied to both surfaces of dielectric plastic films by vacuum evaportion. Interleaving therefore produces a capacitor wherein dielectric plastic films are separated by pairs of metal electrodes connected to each other, in face-to-face contact. In either case, the width of the electrodes in contact with the dielectric is less than that of the dielectric films, so that there is a margin free from metal along at least one edge of each dielectric. In certain constructions, an internal metal-free gap running along the length of an electrode may instead be required. At the boundaries of these margins or gaps there are present metal edges which, at high-voltage operation, can be responsible for corona discharges which result in the degradation and eventual failure of the dielectric.

As stated above, it has been recognized in the art that the risk of such discharges can be reduced, or the applied voltage at which they are initiated can be raised, if there is impregnating material in the margin or gaps.

In the case of prior art interleaved capacitors having dielectrics of synthetic resin films, for example, polystyrene or polyethylene terephthalate, impregnation has been difficult owing to the impervious nature of the dielectric and the fact that the extremely smooth surfaces of the sheets or strips of dielectric tend to cling together over areas which are in contact, thereby preventing the entry of impregnant between them.

It is the main object of the present invention to provide capacitors having synthetic resinous or other impregnation-resistant dielectrics to be readily impregnated with insluating material.

It is another object of this invention to provide a metallized plastic film capacitor that is fully impregnated with insulating material.

In order that the invention may be more clearly understood and readily carried into effect, reference is made to the diagrammatic drawings, in which the thickness of the metal electrode layers is shown greatly exaggerated compared with the dielectric thickness for sake of clarity.

According to this invention, a capacitor comprises interleaved layers of plastic film dielectric material and metallic electrode material wherein each adjacent pair of dielectric layers has therebetween a pair of electrode layers. Each electrode layer provides the adjacent dielectric layer with a metal-free gap extending therealong, or a metal-free margin at one or both edges. Absorbent insulating material is located between the electrode layers at each margin or gap and extends to the edges of the dielectric layers. The absorbent insulating material constitutes a means of access to each gap or margin for an impregnant during impregnation of the capacitor.

By "absorbent insulating material" is meant material, for example, paper of the type used as a dielectric in conventional paper capacitors, which will readily accept an impregnant. The impregnant can be one of those commonly used for capacitors, e.g. petroleum jelly, mineral or silicone oil, mineral or chlorinated waxes, or synthetic resinous materials which, after impregnation, are polymerized in situ to produce a solid impregnant. Obviously impregnants which have an adverse effect on the dielectric would not be used, for example, a mineral oil or petroleum jelly would not be used in association with polystyrene, which is slowly dissolved thereby.

Figure 1:
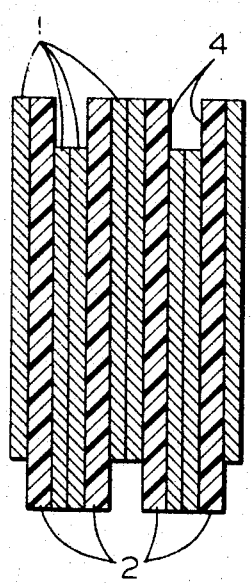
FIGURE 1 is a sectional elevation through a rolled capacitor of conventional prior art construction.

Referring to the drawings, FIGURE 1 shows a capacitor of conventional interleaved type of the prior art wherein pairs of thin metallized electrodes 1 separate plastic dielectric films 2; metal-free margins 4 being left along opposite edges.

In production of the prior art capacitor of FIGURE 1, the plastic dielectric film 2 is metallized on both sides leaving the metal-free margins 4 respectively along opposite edges. Two such metallized films are then superposed or wound together in pairs so that corresponding metal faces are in contact; external electrical contact being made by applying metal, for example, by spraying, to the respective oppositely exposed edges of the electrodes. The metallized electrodes 1 being extremely thin, as compared with the dielectric 2, the marginal dielectric surfaces 4 are almost in contact and may actually close completely together if any heat treatment, which is frequently applied to such units, causes the plastic material to deform and contract. Impregnation is then virtually impossible and high-voltage operation ruled out because of corona discharges at the electrode edges.

Figure 2:
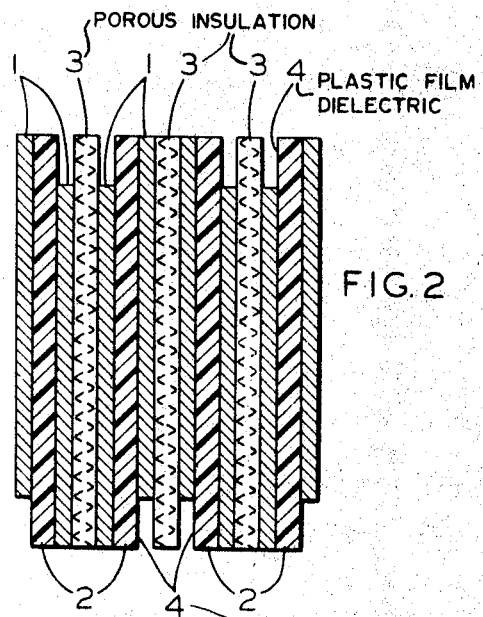
FIGURE 2 is a sectional elevation through a rolled capacitor constructed in accordance with this invention; and, FIGURE 3 is a sectional elevation through a modified form of the capacitor of FIGURE 2 wherein there are internal central gaps in the electrodes.

In FIGURE 2 the construction is similar to that of FIGURE 1, but in accordance with this invention, sheets 3 of absorbent paper are interposed between each pair of electrodes 1. The absorbent paper sheets 3 between the metal faces 1 which would otherwise be in contact extend over the metal-free margin 4 of the dielectric, so that even if the dielectric films do shrink and curl toward each other, the paper is still present at an edge to act as a wick permitting access of the impregnant during impregnation to the space between the dielectric margins, and as a barrier preventing the margins from touching. Although sheets 3 keep adjacent electrode layers 1 from physical contact, electrical contact is obtained as in the prior art of FIGURE 1. Thus, the only active dielectric layers of the capacitor of this invention are the plastic film layers 2; paper layers 3 serving only to ensure impregnation.

Figure 3:
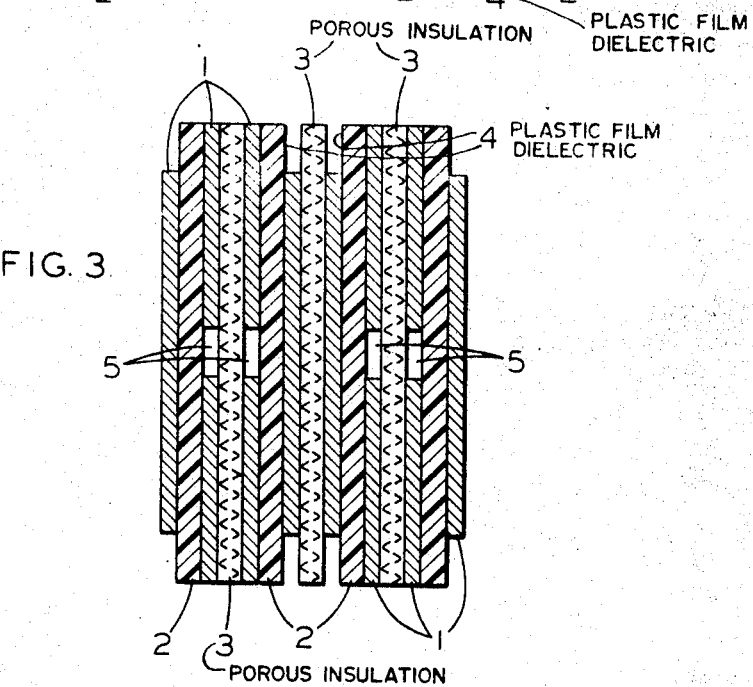

In FIGURE 3 the electrode 1 on one face of each dielectric film 2 is separated into two parts by a central gap 5. This two-part electrode extends to each edge of the dielectric film. The electrode 1 on the other side of each film 2 overlaps the central gap 5 on the opposite face but terminates short of the edges of the dielectric so as to leave margins 4 as before.

This construction is particularly applicable to capacitors for use at very high voltages and provides two capacitances in series, as each plastic film is in effect provided with three electrodes, two on one face separated by the central gap 5 and the third on the other face, overlapping each of the first two electrodes. Connections, as before, are made to the exposed metal at each edge of the unit but the centrally disposed electrodes are "floating"; that is, they are unconnected to any external circuit. In this construction it is particularly important that the central gap 5 be filled with impregnant, for across its edges appears the full working voltage of the capacitor, which may be several kilovolts. For this purpose, sheets of absorbent paper 3 are inserted, in accordance with this invention, between the pairs of metallized surfaces each of which has an intervening gap 5 and which would otherwise be in contact. The sheets 3 function to allow the impregnant easily to reach these gaps 5. The absorbent paper sheets 3 are also provided between pairs of floating electrodes. These will nominally be at the same potential, but, if desired, they may be electrically connected by, for example, cutting the paper sheets 3 short at one end so that the foils definitely touch for a short length.

Although reference has been made to the preferred construction wherein the electrodes are constituted by metallization of dielectric films, it will be appreciated that thin discrete foils could be used for the electrodes. The invention is applicable to flat capacitors as well as to rolled ones, although only the latter have been particularly described.

What is claimed is:

A capacitor comprising a pair of plastic dielectric films metallized on both faces leaving a metal-free margin along an oppositely disposed edge of each face, each of said plastic films serving as the capacitor dielectric between the metallizations on the faces thereof, corresponding margined metallized faces of each of said plastic films being in face-to-face relation, absorbent insulating spacing said corresponding metallized faces, said absorbent insulation being coextensive with said plastic films whereby said corresponding metallized faces are in electrical communication.

References Cited by the Examiner

UNITED STATES PATENTS

| | | | |
|---|---|---|---|
| 2,935,668 | 5/1960 | Robinson et al. | 317—260 X |
| 2,938,153 | 5/1960 | Netherwood | 317—260 X |
| 3,093,775 | 6/1963 | Lamphier | 317—260 |

FOREIGN PATENTS

| | | |
|---|---|---|
| 832,640 | 2/1952 | Germany. |
| 781,763 | 8/1957 | Great Britain. |

ROBERT K. SCHAEFER, *Primary Examiner.*

JOHN F. BURNS, *Examiner.*

D. J. BADER, *Assistant Examiner.*